(12) United States Patent
Zabala et al.

(10) Patent No.: US 10,041,467 B2
(45) Date of Patent: Aug. 7, 2018

(54) DEVICE FOR CAPTURING WAVE ENERGY

(71) Applicant: SENER, INGENIERIA Y SISTEMAS, S.A., Las Arenas-Bizkaia (ES)

(72) Inventors: Inaki Zabala, Bilbao (ES); Alvaro Amezaga, Leioa (ES)

(73) Assignee: SENER, INGENIERIA Y SISTEMAS, S.A., Las Arenas - Bizkaia (ES)

( * ) Notice: Subject to any disclaimer, the term of this patent is extended or adjusted under 35 U.S.C. 154(b) by 0 days.

(21) Appl. No.: 15/308,478

(22) PCT Filed: May 12, 2015

(86) PCT No.: PCT/EP2015/060465
§ 371 (c)(1),
(2) Date: Nov. 2, 2016

(87) PCT Pub. No.: WO2015/173235
PCT Pub. Date: Nov. 19, 2015

(65) Prior Publication Data
US 2017/0184072 A1    Jun. 29, 2017

(30) Foreign Application Priority Data
May 14, 2014    (EP) .................................. 14382169

(51) Int. Cl.
*F03B 13/00* (2006.01)
*F03B 13/24* (2006.01)
*F03B 13/14* (2006.01)

(52) U.S. Cl.
CPC ............ *F03B 13/24* (2013.01); *F03B 13/142* (2013.01); *F03B 13/14* (2013.01); *F05B 2210/40* (2013.01);
(Continued)

(58) Field of Classification Search
CPC ........ F03B 13/14; F03B 13/142; F03B 13/24; F05B 2210/40; F05B 2240/93; Y02E 10/32
(Continued)

(56) References Cited

U.S. PATENT DOCUMENTS 1,455,718 A * 5/1923 Delong ................. F03B 13/266
                                                                417/100
4,466,244 A * 8/1984 Wu ....................... F03B 13/142
                                                                417/100
(Continued)

FOREIGN PATENT DOCUMENTS

GB          2161544 A      1/1986
JP          S50112528 U    9/1975
(Continued)

OTHER PUBLICATIONS

International Search Report dated Aug. 10, 2015 for PCT/EP2015/060465.
Written Opinion dated Aug. 10, 2015 for PCT/EP2015/060465.

*Primary Examiner* — Julio C. Gonzalez
(74) *Attorney, Agent, or Firm* — Lucas & Mercanti, LLP

(57) ABSTRACT

A device (OWC Oscillating Water Column) for capturing wave energy, the upper part of which contains a pressure accumulator (3) connected to the atmosphere through a unidirectional outlet turbine (4) and a vacuum accumulator (6) connected to the atmosphere through a unidirectional inlet turbine (5). The lower portion is formed by at least one block, where each block is made up of a structural column (19), which when submerged in the water gives rise to a water column (8) and an air chamber (1) in the upper portion. Each block is connected to the pressure accumulator (3) through a non-return intake valve (2), and to the vacuum accumulator (6) through a non-return exhaust valve (7), and having an inlet (16) arranged in the lower portion of each structural column (19).

(Continued)

One of the main characteristics of the device is that the pressure (3) and vacuum (6) accumulators act as an air manifold, inhaling and exhaling through the blocks, and at the same time damping sudden changes in pressure.

6 Claims, 9 Drawing Sheets

(52) U.S. Cl.
CPC ........... *F05B 2240/93* (2013.01); *Y02E 10/32* (2013.01); *Y02E 10/38* (2013.01)

(58) Field of Classification Search
USPC ........... 290/42, 43, 53, 54; 60/497, 495, 398
See application file for complete search history.

(56) References Cited

U.S. PATENT DOCUMENTS

| | | | | | |
|---|---|---|---|---|---|
| 4,622,473 | A | * | 11/1986 | Curry | F03B 13/187 |
| | | | | | 290/1 R |
| 7,355,298 | B2 | * | 4/2008 | Cook | F03B 13/148 |
| | | | | | 290/53 |
| 7,830,032 | B1 | * | 11/2010 | Breen | F03B 13/142 |
| | | | | | 290/53 |
| 8,030,789 | B2 | * | 10/2011 | Ortiz | F03B 13/142 |
| | | | | | 290/42 |
| 9,771,920 | B2 | * | 9/2017 | Solheim | E02B 9/08 |
| 2009/0102199 | A1 | * | 4/2009 | Voropaev | F03B 13/142 |
| | | | | | 290/53 |
| 2010/0038912 | A1 | * | 2/2010 | McCarthy | F03B 13/142 |
| | | | | | 290/53 |
| 2010/0237623 | A1 | * | 9/2010 | Brown | E02B 9/08 |
| | | | | | 290/53 |
| 2015/0267676 | A1 | * | 9/2015 | Stanek | F03B 13/142 |
| | | | | | 60/398 |

FOREIGN PATENT DOCUMENTS

| | | |
|---|---|---|
| JP | S5652582 A | 5/1981 |
| JP | H10176649 A | 6/1998 |
| WO | 2007057013 A1 | 5/2007 |
| WO | 2007131289 A1 | 11/2007 |

\* cited by examiner

DEVICE FOR CAPTURING WAVE ENERGY

CROSS REFERENCE TO RELATED APPLICATION

This Application is a 371 of PCT/EP2015/060465 filed on May 12, 2015, which claims priority of European Application No. 14382169.2 filed May 14, 2014, both of which are incorporated herein by reference.

FIELD OF THE INVENTION

The present invention pertains to the field of capturing wave energy by using oscillating water column technology, and more specifically, to the arrangement of the chambers in which energy is captured in the form of pneumatic energy, to the valves that direct the airflow from/to the chambers, and to the turbines that convert the pneumatic energy into electric energy.

BACKGROUND OF THE INVENTION

Oscillating water column (OWC) technology consists of a partially submerged structure with an underwater opening that enables the movement of the sea to create a compression and a vacuum of the air enclosed within the inner cavity or air chamber. When a wave acts upon the OWC device, it causes the water contained within the structure to move, thus pressing and pushing the air inside the chamber, making it pass through a turbine specially designed for this purpose. Once the water recedes, the air in the chamber is decompressed and suctioned through the turbine. A generator coupled to the turbine converts the rotational mechanical energy of the latter into electricity.

The turbines that are normally used in OWC devices are bidirectional, such as Wells, Setoguchi or bi-radial turbines, which are designed to rotate in the same direction regardless of the direction of the airflow. Thus, despite the alternating movement of the waves, the turbine and the associated electric generator can permanently spin at a high speed, since their spin direction is always the same.

There is a second approach based on the use of unidirectional turbines, that means these turbines only operate with a single air inlet direction, such that the airflow must be rectified. The airflow is rectified by means of a set of non-return valves. There are different designs for devices with this approach using different arrangements with more or fewer valves and turbines. Among the most documented of these are the following:

One turbine, four valves, circuit open to the atmosphere
One turbine, two valves, circuit open to the atmosphere
One turbine, two valves, circuit closed In this last case, the column at the turbine inlet is above atmospheric pressure, and the column at the outlet is below atmospheric pressure.

Given the natural oscillation of the waves, the horizontal cross-section of these columns cannot be very large, as the effects of the crest and trough of the wave would be combined in the same column, which would create an averaging effect whereby the variation in the mean height of the water column would be zero, and the energy thereof could not be exploited.

In order to enable an increase in the power of the devices and reduce operating and maintenance costs, while avoiding the aforementioned averaging effect, several columns may be joined together in a single platform, spaced far enough apart that they do not significantly diminish one another's waves, and moreover improving the stability of the overall energy output. In the case of bidirectional or unidirectional turbines with rectified airflow, the devices of the platform must be independent in terms of both the water column and the air chambers. This is due to the fact that, were they to be joined, the pneumatic pressure of one chamber would be cancelled out by the vacuum in the other.

One advantage to situating several devices in the same platform is that all of them share the equipment for converting the alternating current generated by each one of them into a continuous current in order to connect the energy from each one of them to a single cable and convert it again into alternating high-voltage energy to be transmitted, and which can be injected into the grid through an electrical substation. Moreover, the overall dimensions of this infrastructure are smaller than the sum of each one of them separately, since the power peaks of the various devices tend not to coincide in time.

In the specific case of closed-circuit unidirectional turbines, the pressure and vacuum chambers of each one of the devices may be joined together in order to feed a single, larger and more efficient turbine. In this case the difference in pressure and flow are also more stable, as with the power produced.

These constructions, which may be rather large floating structures, or may be situated on the shoreline or on breakwaters, include large tubes where the volume of water enters. The design of said constructions tends to vary in order to obtain higher energy efficiency, and they are more robust so as to withstand the force of the sea, are modular so as to reduce costs, and have unique designs for better maintenance.

Thus, the various known designs bring different technical solutions to the state of the art. Patent GB 2161544 presents a multi-column platform with a unidirectional turbine that operates on a closed circuit between two vacuum and pressure manifolds fed by the various chambers. The device is long enough so that at the same moment there may be columns compressing and expanding. Mechanical or water non-return valves are used to control the flow of the pressure created. There is a version that includes an extra pressure tank that may be fixed or have a variable volume.

Other patents present design advantages over the same setup. For example WO 2007057013 designs a setup facing towards the direction of the waves with a boomerang shape, anchored to land by its tip or by its ends. Likewise, the vacuum forces help to reduce loads on the platform by managing to reduce its weight, which opens up the possibility of distributing the multiple columns in two arms forming a V, and which allows for the depth in the water to be adjusted by means of air valves connected to the exterior.

Patent WO 2007131289 presents a generator that comprises a body made up of a plurality of chambers with non-return valves. A first vessel receives the air from a first set of chambers and passes it through the generator, which sends it into a second set of chambers that also have non-return valves.

All of the solutions using pressure and vacuum chambers are equipped with a turbine between these two closed volumes of a limited size, such that the volume to be sent through the turbine is smaller, and the flow more variable, thus directly reducing performance.

All of these solutions entail large oscillations in pneumatic power, leading to a reduction in the performance of the devices. It would therefore be desirable to develop a device for capturing wave energy that improves upon the features of the existing devices.

The new device, which is the subject matter of the invention presented herein, has two turbines arranged in direct contact with the atmosphere, one of them being connected to a pressure accumulator and the other to a vacuum accumulator. Said accumulators act as manifolds and dampers, without the need for connecting piping or any additional tanks. All of this enables the device to have improved performance due to the reduction in head loss and to more stable turbine operating conditions, as well as a reduction in the cost of the energy generated.

DESCRIPTION OF THE INVENTION

The invention relates to a device for generating energy from waves by means of the OWC technique, wherein the pressure and vacuum accumulators, the air chambers and the water columns are integrated into the same structure, without connecting piping between them, thus preventing loss of pressure.

Another subject matter of the invention is for the pressure and vacuum accumulators to each have their own unidirectional turbine directed towards the atmosphere, instead of a single turbine between the two accumulators. To this is added the characteristic that the chambers be in contact with the atmosphere, instead of chambers connected to one another, as there is a turbine working between two closed volumes of a limited size, and the flow to be sent through the turbine is smaller and the turbulence higher, causing a reduction in performance. The turbines need stability, and this stability is provided by the pressure and vacuum accumulators, each of which is associated to its own turbine.

A further subject matter of the invention is for the accumulator to function as a manifold, as opposed to having the accumulator situated in a compartment outside the manifold that collects the pneumatic energy of the air chambers, as this latter arrangement affects the cost of the system.

One subject matter of the invention is to provide a device having water columns, air chambers and pressure and vacuum accumulators with suitable dimensions, bearing in mind the manufacturing requirements and the costs associated with the structure, with respect to the technical characteristics achieved with the dimensions obtained, as accumulators with larger volumes make it possible to obtain more stable pressure.

A further subject matter of the invention is to orient the opening of the columns with respect to the direction of the waves, to which end, if the platform is a floating platform, it will be equipped with a system so that the device that is the subject matter of the invention shall be suitably oriented towards the thrust of the waves.

A further subject matter of the invention is for the distance between two sets of water columns and air chambers to be suitable so that the capture of energy from the various chambers is as high and uniform over time as possible.

A further subject matter of the invention is for the angle of the water column inlets and the height thereof to be such that it reduces how much the wave energy is diminished, also bearing in mind that equipping the submerged column with an end or an inlet having a certain angle reduces the "shadow" effect between the columns and maximizes the energy captured by the device.

A further subject matter of the invention is for the water columns to have vertical separators limiting the oscillation of the surface of the water inside of them caused, among other things, by the oscillation of the device, if it is a floating device.

These and other aims are achieved with a platform formed by two accumulators (one for pressure and one for a vacuum), one or several blocks made up of: a water column, an air column and non-return valves connecting it to the accumulators, where the design of the submerged blocks ends at a certain angle to reduce the shadow effect of the other blocks on the waves, where the pressure/vacuum accumulators act as manifolds of the energy absorbed by the various air chambers, and where a unidirectional turbine is arranged in each accumulator, connecting it to the atmosphere. The following advantages are derived from present invention: higher performance of the device due to the reduction in head loss and to better and more stable turbine operating conditions, as well as the lower cost of the energy generated. Moreover, the fact that the device has turbines oriented towards the exterior makes it easier to change out any of the parts employed during repair and maintenance, and even to change out the entire turbine.

BRIEF DESCRIPTION OF THE DRAWINGS

What follows is a very brief description of a series of drawings that aid in better understanding the invention, and which are expressly related to an embodiment of said invention that is presented by way of a non-limiting example of the same.

In the detailed description of the invention, specific dimensions for the various chambers of the device are shown solely for illustrative purposes. It shall fall upon the designer to, given the needs of a specific project not limited to a target power to produce, a geographic location, budget or cost, seek the right sizes in order to achieve the best energy cost and the optimum return on their investment.

DETAILED DESCRIPTION OF THE INVENTION

Figure 1A:
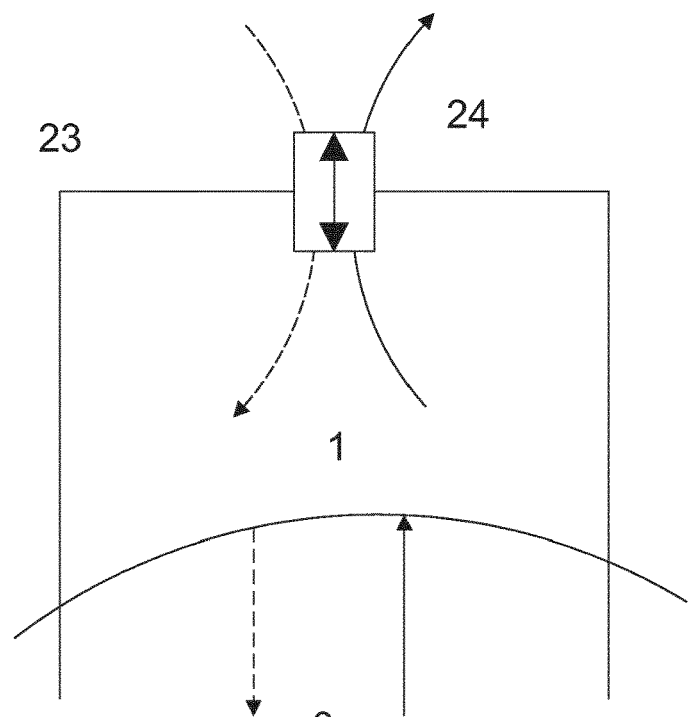
FIGS. 1A-1F illustrate different embodiments in the state of the art, or of their operating conditions.

FIG. 1 shows the known state of the art, where, specifically:

FIG. 1A shows a standard OWC device where (8) is the water column, (1) is the air chamber, (24) is the bidirectional turbine and (23) is the atmosphere.

Figure 1B:
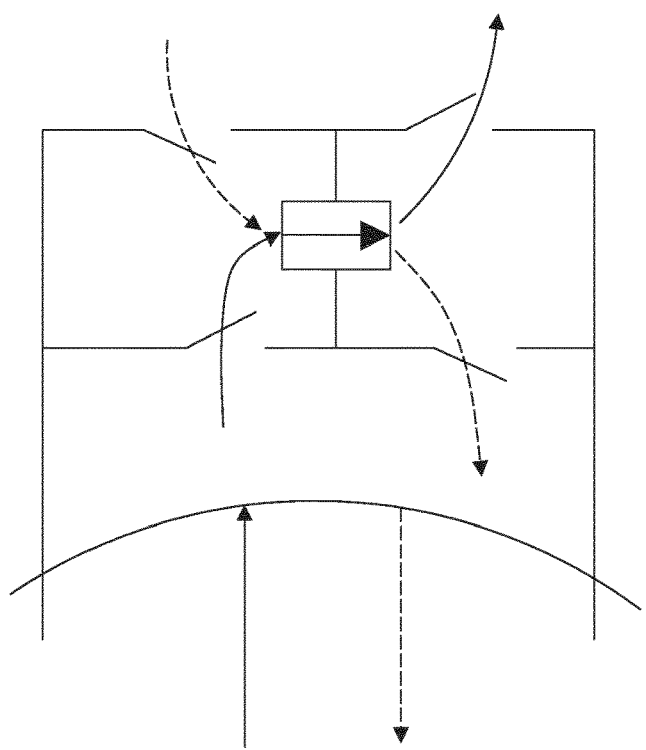

FIG. 1B shows an OWC device with a unidirectional rectified airflow turbine with four non-return valves.

Figure 1C:
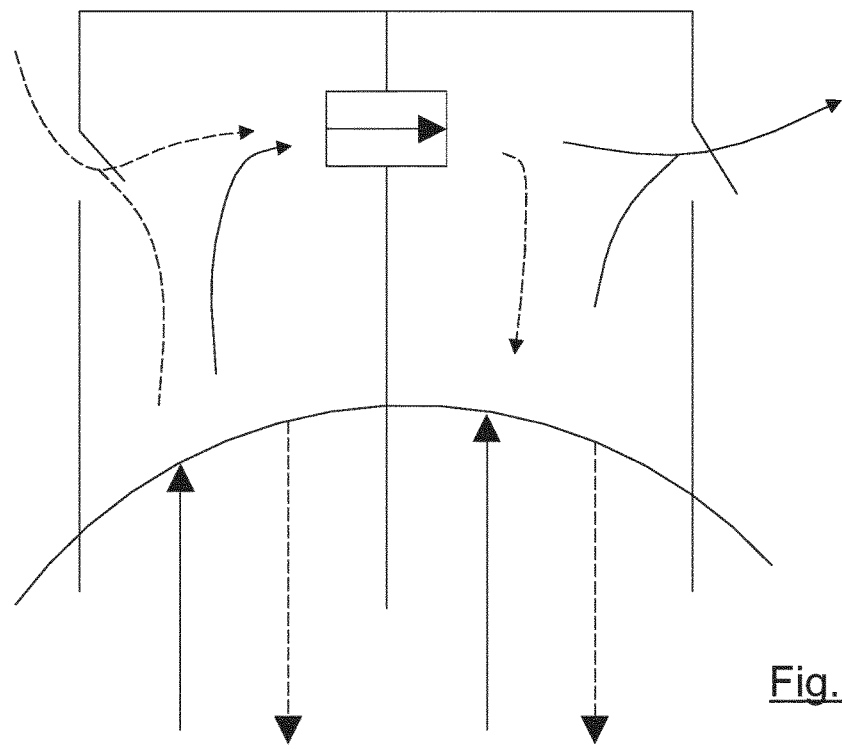

FIG. 1C shows an OWC device with a unidirectional rectified airflow turbine with two non-return valves.

Figure 1D:
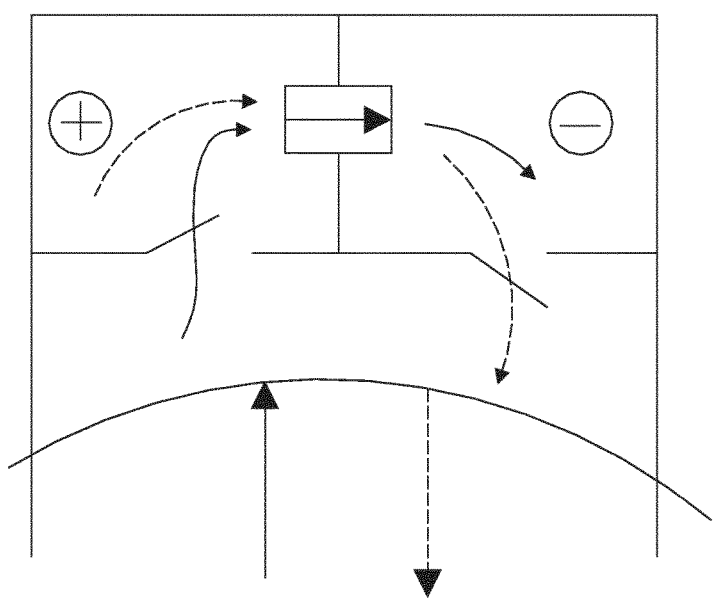

FIG. 1D shows an OWC device with a unidirectional, rectified airflow, closed-circuit turbine with two non-return valves.

Figure 1E:
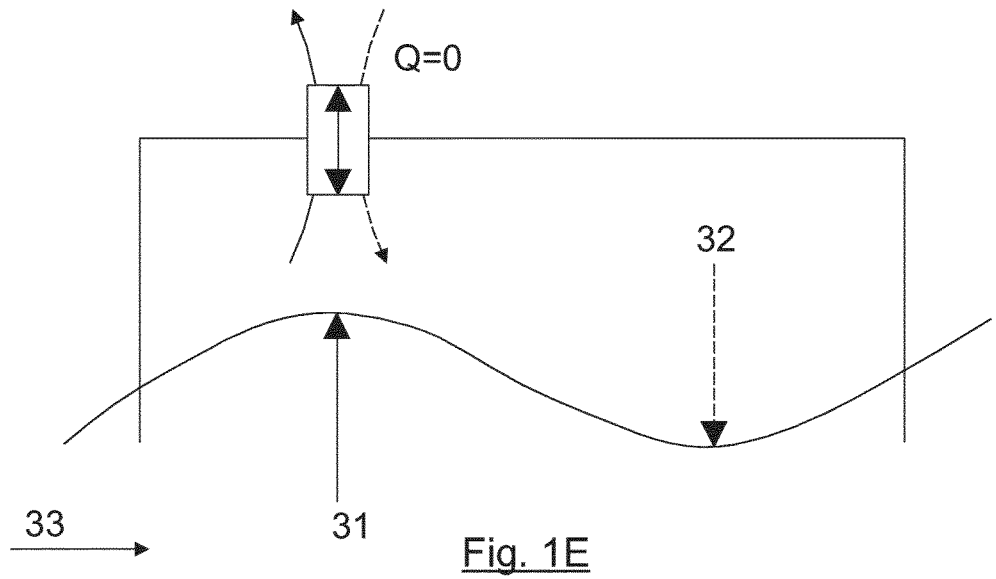

FIG. 1E shows a standard oversize OWC device with an arrow indicating the direction of the wave (33), wherein outside the device there is a crest (31) and a trough (32), meaning that the flow (Q) collected by the turbine is almost null.

Figure 1F:
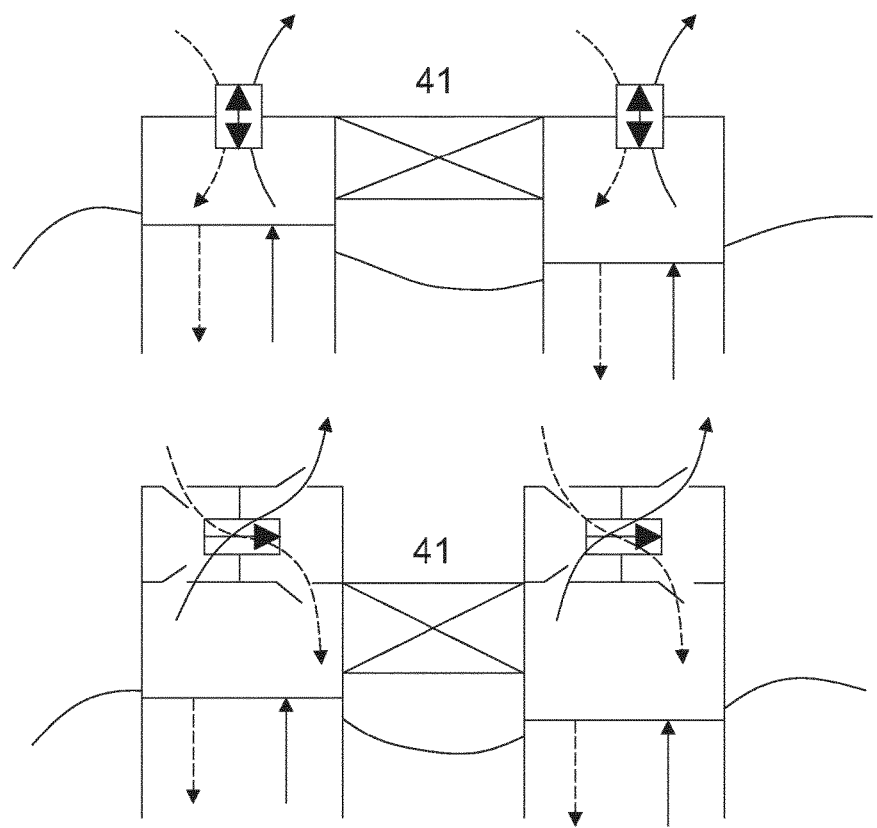

FIG. 1F shows two platform options with several standard OWC devices joined together by a rigid structure (41).

Figure 1G:
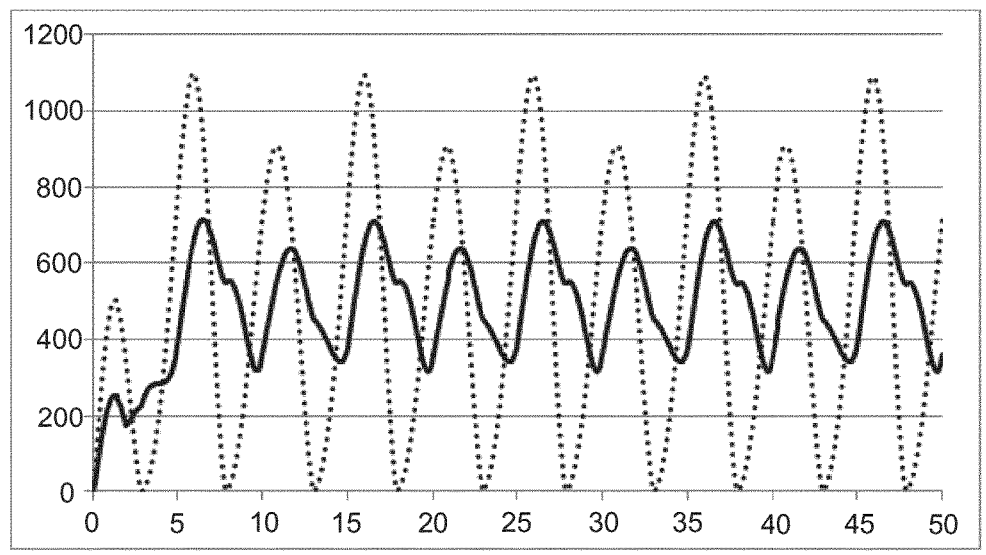
FIG. 1G shows a graph comparing overall electrical power versus time in the case of two independent devices with respect to that which is captured by a platform similar to the platform shown in FIG. 1F.

FIG. 1G is a graph comparing overall electrical power versus time in the case of two independent devices (dotted line) with respect to that which is captured by a platform like the one in FIG. 1F (solid line). One can see that the statistical trend is to reduce the peaks and troughs of the electricity output.

Figure 1H:
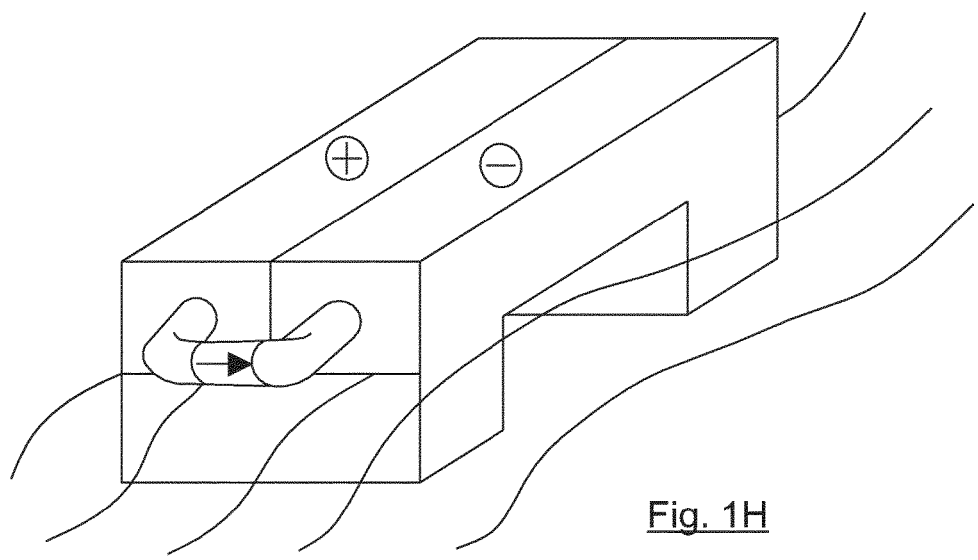
FIG. 1H shows a standard configuration of a platform with several blocks connected through a pressure manifold and a vacuum manifold joined together through a unidirectional closed-circuit turbine.

FIG. 1H shows a standard configuration of a platform with several blocks connected through a pressure manifold and a vacuum manifold joined together through a unidirectional closed-circuit turbine.

Figure 1I:
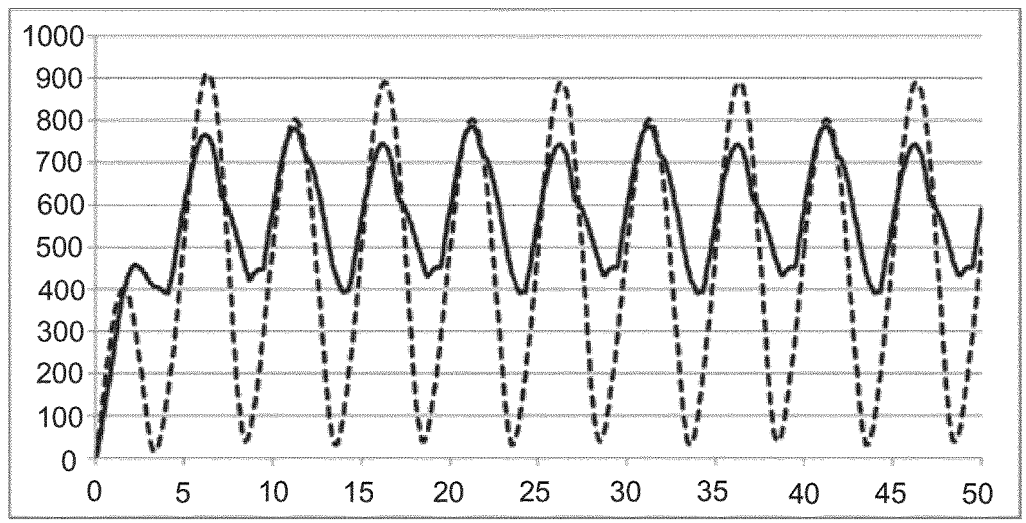
FIG. 1I shows a graph representing overall pneumatic power versus time in the case of two independent devices with respect to that which is captured by a platform similar to the platform shown in FIG. 1H.

FIG. 1I is a graph representing overall pneumatic power versus time in the case of two independent devices (dotted line) with respect to that which is captured by a platform like the one in FIG. 1H (solid line). One can see that the delivered pneumatic power is more stable when the devices are joined together, along with an increase in the average power.

Figure 2:
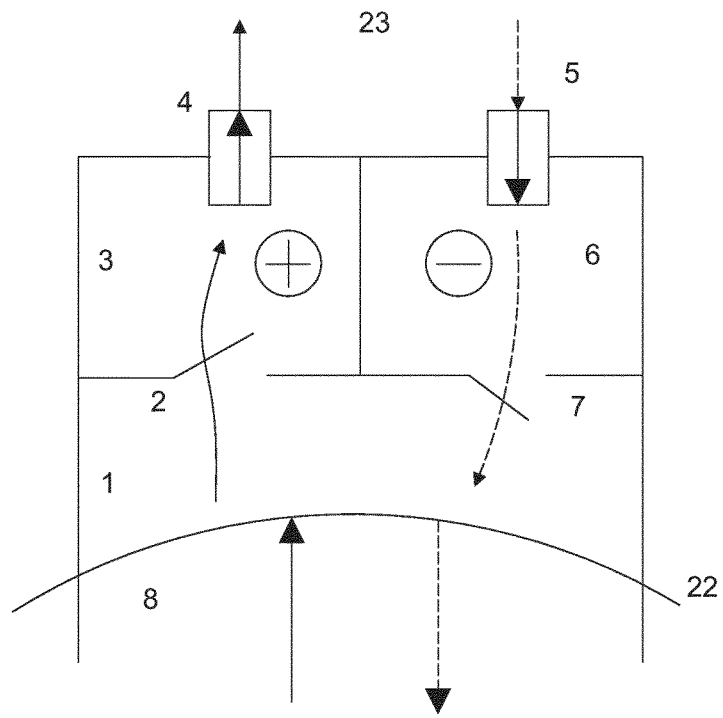
FIG. 2 shows a device for capturing wave energy in accordance with an embodiment.

The arrangement of the oscillating water column device (OWC) that is the subject matter of the present patent application, and more specifically, of the column and its corresponding inner chambers and accumulators that house the turbines actuated by the energy captured from the waves, is as shown in FIG. 2. The wave (22) has an up and down movement that causes the water column (8) to move up and down, represented by the solid and dashed lines, respectively. When the water column (8) rises, the pressure created in the air chamber (1) creates an airflow that passes through the non-return intake valve (2) and enters the pneumatic pressure accumulator (3), resulting in overpressure. There, the concentrated air has enough pressure to move the corresponding unidirectional outlet turbine (4) and being exhausted to the atmosphere (23). Once this process is completed, when the water column (8) begins to decrease, the atmospheric air flows through the unidirectional inlet turbine (5) to fill the vacuum accumulator (6), and from there it is sent through the non-return exhaust valve (7) into the air chamber (1). The non-return intake (2) and exhaust valves (7) open and close alternately on each accumulator, making pressure/vacuum possible in the accumulators.

Figure 3A:
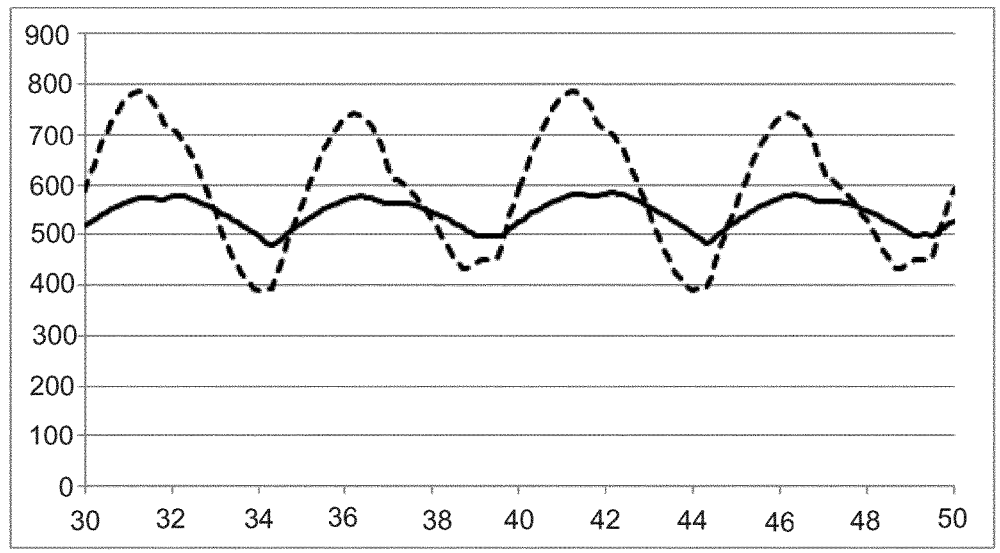
FIG. 3A shows a graph illustrating the pneumatic power of a first accumulator with volume V, with respect to the pneumatic power of a second accumulator whose volume is 7 times greater.

FIG. 3A analyzes the influence of volume on the accumulators. The dashed line shows the pneumatic power of an accumulator with volume V, with respect to the solid line showing the pneumatic power of an accumulator whose volume is 7 times greater (7V). It may be observed that the greater the volume, the more constant the rate and the better the performance of the turbine, although the average power is, however, lower and the manufacturing costs are higher.

Figure 3B:
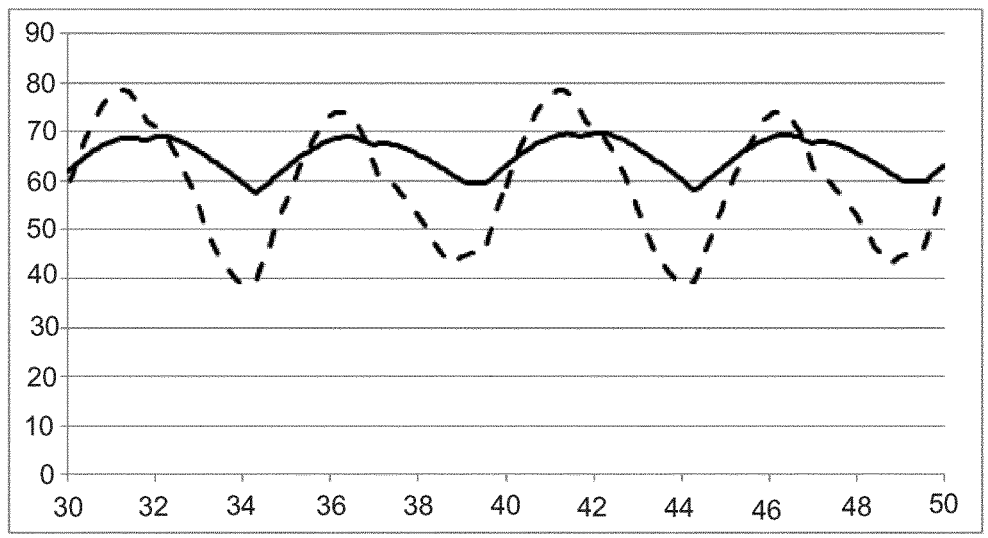
FIG. 3B shows electrical power generated for a device with different accumulator volumes than those shown in FIG. 3A.

FIG. 3B shows electrical power generated for a device with different accumulator volumes than those shown in FIG. 3A. The dashed line shows a device with a small accumulator volume and a higher-power air turbine, while the solid line shows a device with larger accumulator volumes and a turbine having lower nominal power but higher performance. In this case it can be seen how the electrical production of the complete device is higher. It shall fall upon the designer to seek out ideal intermediate dimensions with the lowest cost for the energy produced.

Figure 4:
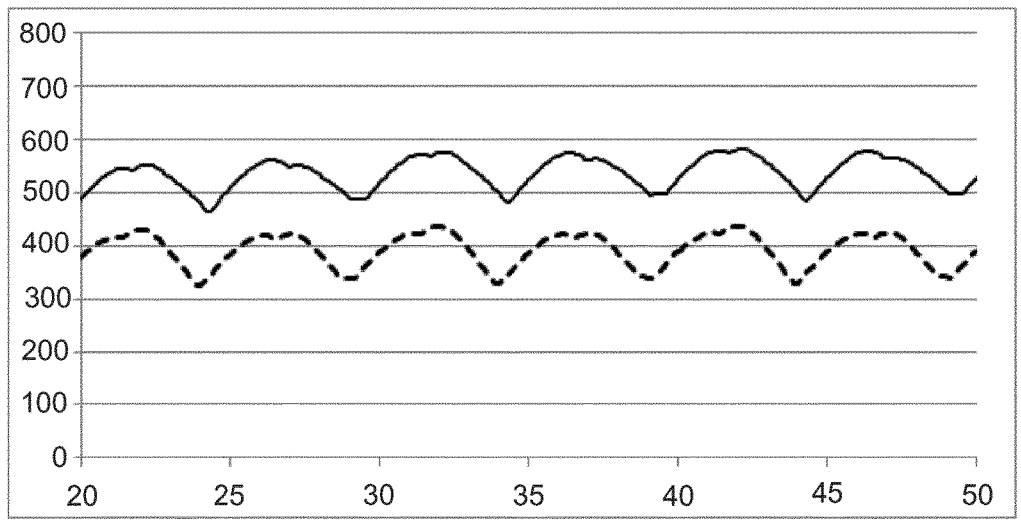
FIG. 4 is a graph representing pneumatic power versus time for a device with multiple blocks according to the invention presented herein (with two unidirectional turbines connected to the atmosphere) and the output of a device with multiple blocks with a unidirectional turbine connecting the pressure and vacuum accumulators in a closed circuit.

Above, it was mentioned that there is an arrangement whereby the pressure (3) and vacuum (6) accumulator chambers each have their own unidirectional turbine (4 and 5) directed towards the atmosphere, instead of a single turbine between the two pressure (3) and vacuum (6) accumulator chambers. FIG. 4 uses a solid line to show the behavior of the solution with two unidirectional turbines directed towards the atmosphere, with respect to the dashed line showing a single unidirectional turbine between the two chambers.

Figure 5:
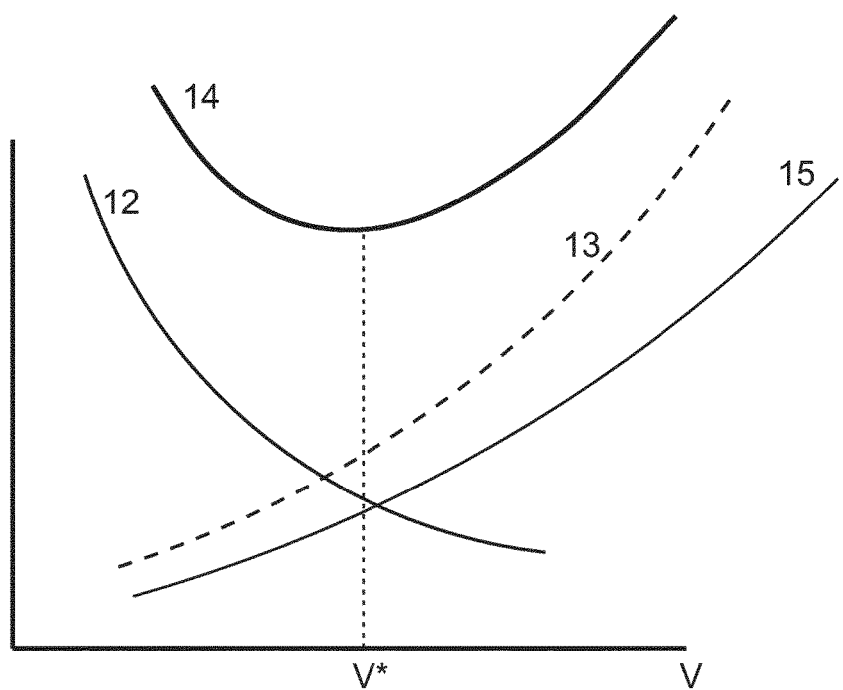
FIG. 5 compares the performance of the OWC, the performance of the turbine, the cost of the energy and the cost of the device, with the volume of the accumulators.

The key characteristic of the accumulator (3 or 6) is its volume. The bigger it is, the more it dampers variations in pneumatic pressure at the intake of the accumulator (3 or 6), making the pressure at the outlet more constant. This damping improves the performance of the turbine and the alternator, as both are higher the more stable the pressure at the inlet. However, increasing the volume leads to a reduction in the pneumatic energy available for the turbine, and increases manufacturing costs. For this reason, finding the right size for the accumulators involves seeking a volume at which the reduction in pneumatic performance and the increase in manufacturing costs are compensated by the increase in turbine performance. This is the point at which the cost of the energy will be at its lowest, as is shown in FIG. 5, where the x-axis is the volume of the accumulators and the y-axis is performance and cost. The solid line is pneumatic performance (12), the dashed line is the performance of the turbine (13) and the solid line is the cost of the device (15). The curve at the top is the cost of the energy generated (14), and its lowest point indicates the ideal volume for the accumulator design.

Figure 6:
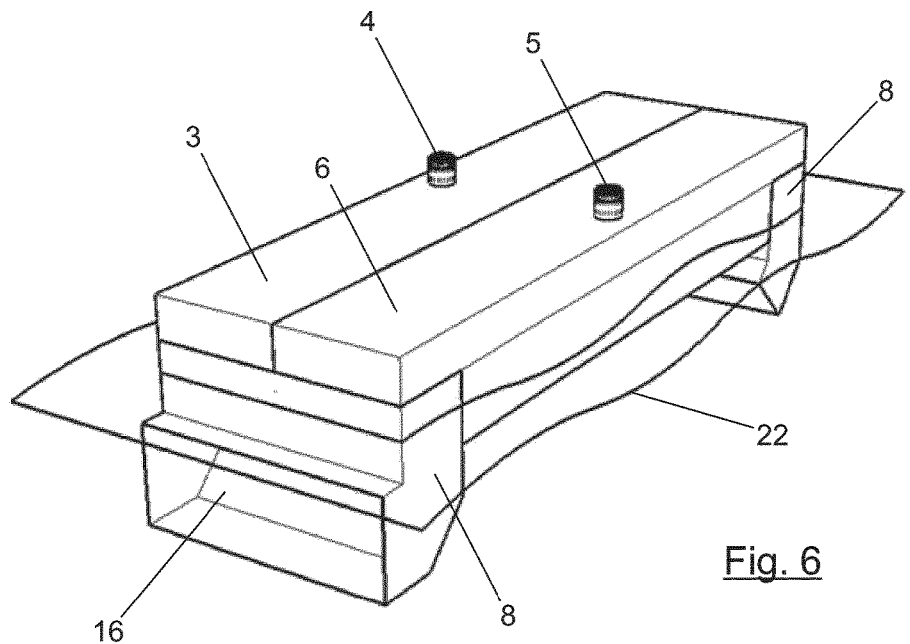
FIG. 6 shows a platform with different options for the opening of the column inlets.
Figure 7:
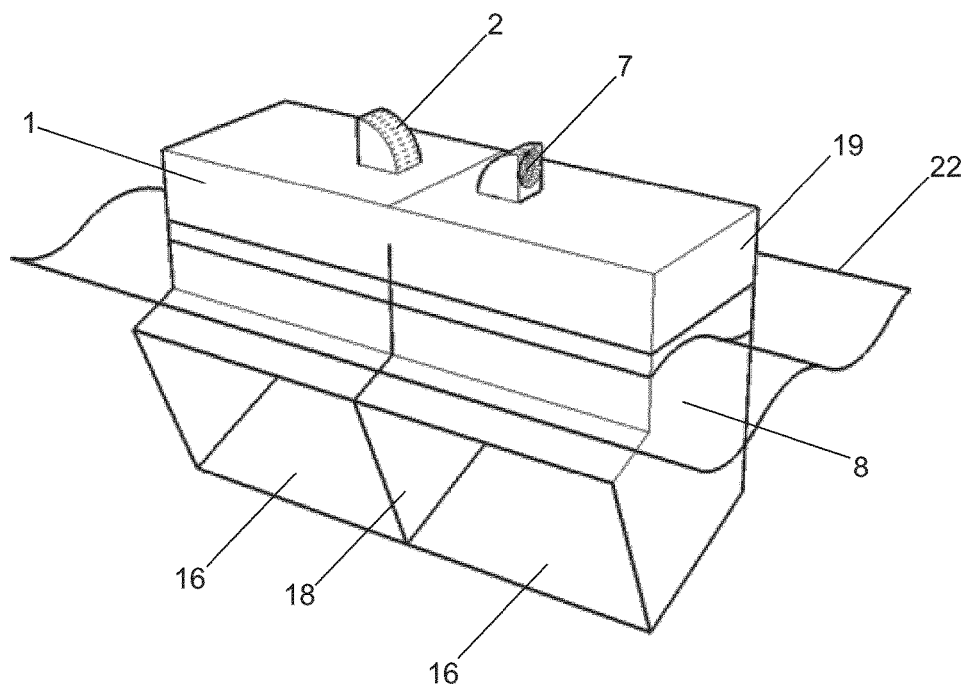
FIG. 7 shows a block of the device in isolation, with the elements that make it up.

FIG. 6 shows the embodiment of a device whose lower portion is formed by joining together various blocks, where each block is connected to the pressure (3) and vacuum (6) accumulators, from which the corresponding outlet (4) and inlet (5) turbines protrude. The entire assembly forms a floating platform that includes mooring and orientation systems to position itself with respect to the wave (22). The lower portion of the structural columns (19) is equipped with inlets (16). Said inlets may have different heights and/or inclinations to optimize wave (22) capturing and reduce shielding between blocks. The common orientation of the inlets (16) is against the waves, although in some imple- FIG. 7 shows a block in isolation, wherein one can see the elements that make it up: a structural column (19), which when submerged inside the wave (22) forms a water column (8) and an air chamber (1). The block is completed by two non-return valves (2 and 7), the intake (16), and in some setups one or several intermediate walls (18) to minimize wave turbulence inside the structural column, and to provide the block with greater rigidity.

Figure 8A:
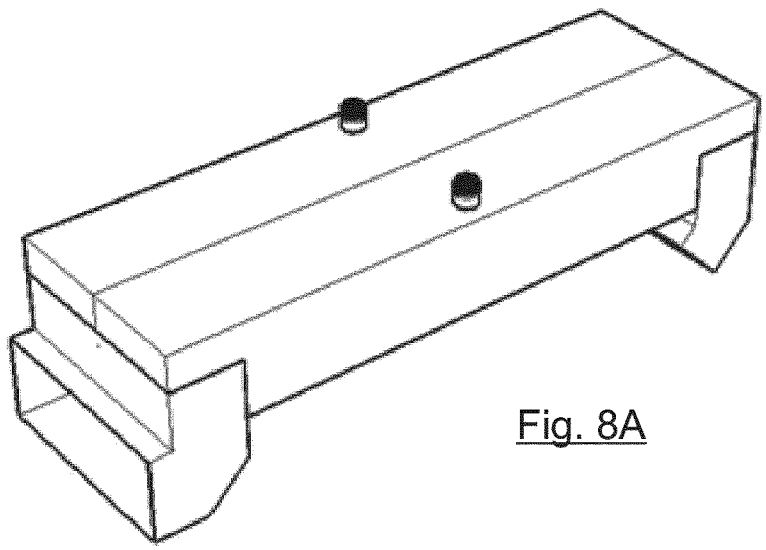
FIG. 8A shows device for capturing wave energy that has two blocks.
Figure 8B:
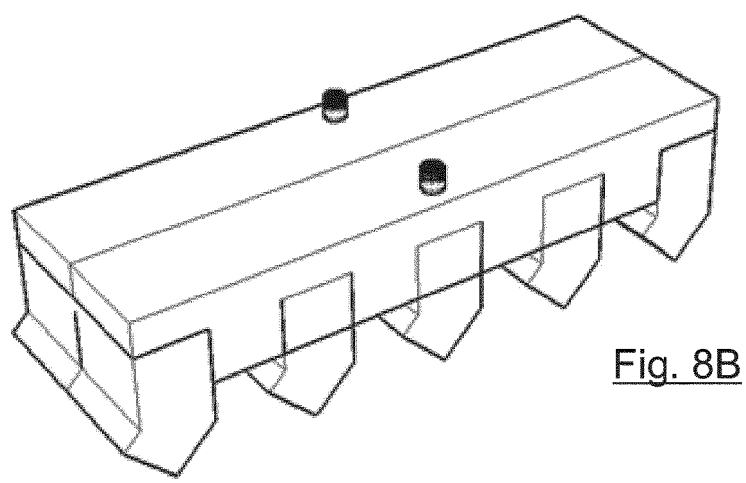
FIG. 8B shows a device for capturing wave energy that has several blocks separated by short distances.
Figure 8C:
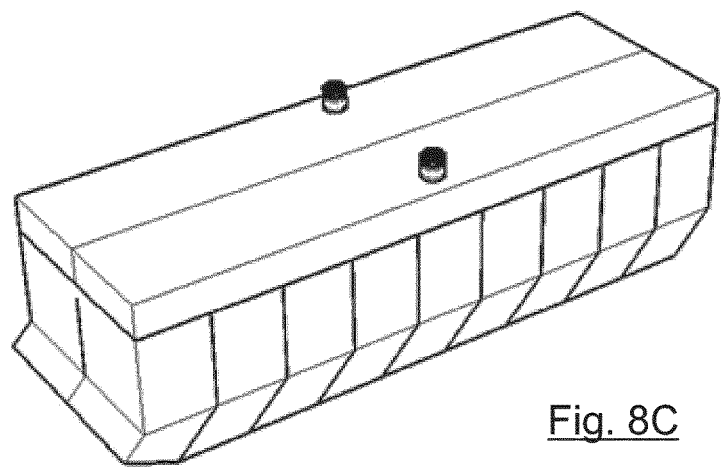
FIG. 8C shows a device for capturing wave energy that has several blocks wherein each respective block is in contact with one or more other blocks.

FIG. 8 shows other embodiments with the same device, showing a pressure accumulator (3) and a vacuum accumulator (6), from which the corresponding outlet (4) and inlet (5) turbines protrude. The difference resides in the number of blocks that each device incorporates. Option (a) is the one already discussed in FIG. 6; option (b) is similar to the previous option, but with still more blocks having the same structural column (19) dimensions inserted to reduce the intervening gap; and lastly, option (c) is the one that incorporates so many blocks that they cover the entire surface of the device that is the subject matter of the invention. In this way, there may be several possible configurations for a device with the same overall dimensions, where the number of blocks, and therefore the distance between them, may vary, such that said distance may even be null. The system indicated may acceptably be applied in floating and fixed devices (usually near the coast, on the shoreline, or on breakwaters).

The invention claimed is:

1. A device for capturing wave energy, the device comprising:
   a lower part comprising a block that comprises:
      an air chamber adapted to hold a first volume of air having a first pressure; and
      an inlet adapted to allow water to enter the air chamber, wherein an entry of water into the air chamber affects the first pressure of the first volume of air in the air chamber; and
   an upper part that comprises:
      a pressure accumulator comprising a first air manifold, the pressure accumulator being connected directly to the air chamber via a non-return intake valve, the pressure accumulator being further connected to the atmosphere via a unidirectional outlet turbine, the pressure accumulator being adapted to hold a second volume of air having a second pressure greater than atmospheric pressure, the pressure accumulator being further adapted to transfer air from the air chamber to the unidirectional outlet turbine without use of piping; and
      a vacuum accumulator comprising a second air manifold, the vacuum accumulator being connected directly to the air chamber via a non-return exhaust valve, the vacuum accumulator being further connected to the atmosphere via a unidirectional inlet turbine, the vacuum accumulator being adapted to hold a third volume of air having a third pressure less than atmospheric pressure, the vacuum accumulator being further adapted to transfer air from the unidirectional inlet turbine to the air chamber without use of piping;
   wherein the pressure accumulator and the vacuum accumulator are adapted to inhale and exhale through the block and to dampen sudden changes in pressure.

2. The device for capturing wave energy according to claim 1, wherein the lower part comprises a plurality of blocks.

3. The device for capturing wave energy according to claim 2, wherein the plurality of blocks of the lower part are separated by respective distances.

4. The device for capturing wave energy according to claim 2, wherein each respective first block of the plurality of blocks of the lower part is in contact with a respective second block of the plurality of blocks.

5. The device for capturing wave energy according to claim 1, wherein each block has a wall disposed in the air chamber, the wall adapted to reduce wave motion inside the block.

6. The device for capturing wave energy according to claim 1, wherein the device is a floating device.

* * * * *